Patented Jan. 15, 1952

2,582,589

UNITED STATES PATENT OFFICE 2,582,589

VITAMIN $B_{12}$ PURIFICATION PROCESS

Howard H. Fricke, Waukegan, Ill., assignor to Abbott Laboratories, North Chicago, Ill., a corporation of Illinois No Drawing. Application May 13, 1949,
Serial No. 93,202

1 Claim. (Cl. 167—81)

This invention relates to an extraction process and more particularly to the concentration and extraction of the physiological factor known as vitamin $B_{12}$.

This new vitamin compound is found in certain fermentation culture media such as some of the streptomyces, etc., as pointed out by Rickes, et al., Science, 108, 634, 1948. The vitamin is found in very minute quantities, making the isolation extremely difficult. The cultures further contain many other ingredients, having properties similar to the vitamin $B_{12}$, rendering a very difficult separation.

According to the present invention, I have discovered a concentration procedure which produces an aqueous concentrate of the vitamin $B_{12}$ suitable for medicinal use.

The general procedure of concentrating the vitamin $B_{12}$ from the culture medium or beer is as follows:

The beer from the fermentation process containing vitamin $B_{12}$ is treated with a water-miscible organic solvent to precipitate unwanted inert material, and the filtrate then treated with additional water-miscible organic solvent to precipitate the desired vitamin $B_{12}$. The vitamin $B_{12}$ precipitate is then dissolved in water, and the resulting solution treated with aluminum oxide to remove other unwanted inert materials. In the preferred process, the initial vitamin $B_{12}$ precipitate is subjected to additional purification treatments, including the use of cation and anion exchange resins as outlined below.

The beer from the fermentation process, either from the surface culture or the submerged culture fermentation, is filtered to remove the suspended solids and spores, and the clarified beer is concentrated. A portion of the solids of this concentrated beer is precipitated by the addition of a miscible solvent. For instance, by adding acetone to make about a 50% solution, ethyl alcohol to make about a 70% solution, methyl alcohol to make about a 70% solution, isopropyl alcohol to make about a 50% solution, etc., a certain amount of solids are precipitated. The solution is filtered and the precipitate may be discarded. To the filtrate is added more of the solvent to increase the concentration, which causes another precipitate, and this precipitate contains the vitamin $B_{12}$. When acetone is used as a solvent, the solution is made up to at least about 70% acetone to precipitate the vitamin $B_{12}$, and with ethyl alcohol up to about 95%; with methyl alcohol up to about 95%; with isopropyl alcohol up to about 70%, etc. The solution is filtered and the filtrate is discarded. The precipitate is dissolved in water equal to a small fraction of the original volume of beer, and a miscible solvent is again preferably added to the aqueous solution causing another precipitate. The concentration of the solvents is the same as given above for the precipitation of the vitamin $B_{12}$. The solution is filtered and the filtrate is discarded.

In the steps of precipitation of the solids, the concentration of the solvents is a critical factor. In the first precipitation from the raw beer, if the concentration is greater than that given for the solvents, the vitamin $B_{12}$ starts to precipitate with the unwanted inert material, which will then be lost in the precipitate which is discarded. In the second and third precipitation, if the concentration is less than that given, the vitamin $B_{12}$ will not be precipitate and will be lost in the filtrate which is discarded. The concentration of the solvent used must be determined individually as the solubility of the vitamin $B_{12}$ varies with each solvent.

The precipitate from the last step is dissolved in water equal to a small fraction of the volume of the original beer. To this solution is added 30 to 60% w/v ammonium sulfate, which produces a precipitate (the term w/v is a percentage mensuration relationship of the weight of the solid divided by the volume of the solution) the solution is filtered and the filtrate is discarded. The precipitate is preferably again dissolved in water, and is reprecipitated with 30 to 60% w/v ammonium sulfate, or a water-miscible solvent, such as given above, may be used to precipitate the vitamin $B_{12}$. The solution is filtered and the filtrate is discarded. The precipitate is dissolved in a small volume of water, and the solution is then titrated to a pH of about 4 with a synthetic cation exchange resin, such as "Amberlite IR–120." The solution is treated with aluminum oxide, by suspending the aluminum oxide in the solution by agitation. The agitation is continued for a short time, and the solution is filtered. The filtrate is preferably again treated with aluminum oxide and again filtered.

The filtrate from the second aluminum oxide treatment is passed over a column of cation and anion exchange resins packed in alternate layers. The filtrate from the column is then passed over another column packed alternately with aluminum oxide which has been previously washed with sulfuric acid to a pH of about 8 and aluminum oxide which has previously been washed with sulfuric acid to a pH of about 4.

The filtrate from the column is again passed over the alternately packed cation and anion exchange resins.

The purification process could be run without the initial concentration of the raw fermentation culture media, but it is desirable to concentrate the beer so that the volume of solvents used is not too great.

In most specific detail, the following examples will serve to illustrate the process of the invention:

Example I

About 24 liters of a streptomycin fermentation beer (obtained by using *Streptomyces griseus*) is concentrated under vacuum to about 4 liters, containing about 0.943 micrograms per cc. of vitamin $B_{12}$ and total solids about 19.85%.

To about one liter of the above concentrate is added about 900 cc. of acetone. The resulting mixture is filtered and the precipitate is washed with 50% acetone, and the filtrate plus washings contain about 7.4% total solids and 0.45 micrograms per cc. of vitamin $B_{12}$. The filtrate is brought to about 70% acetone by adding a sufficient quantity of acetone to make about 3300 cc. of the solution. The precipitate which is formed is filtered off, and the filtrate is discarded. The precipitate is dissolved in a sufficient quanttiy of water to make about 1000 cc., total solids 6.1% and 0.68 micrograms per cc. of vitamin $B_{12}$.

About 3300 cc. of isopropanol is slowly added with stirring to the 1000 cc. of solution. The precipitate which is formed is filtered off and the filtrate discarded. The precipitate is dissolved in sufficient water to make about 400 cc., containing 8.53% total solids and about 1.69 micrograms per cc. of vitamin $B_{12}$.

About 240 g. of ammonium sulfate are slowly added with shaking to the 400 cc. of solution. The precipitate which is formed is filtered off and dissolved in sufficient quantity of distilled water to give a volume of about 100 cc. The solution is reprecipitated by adding about 60 g. of ammonium sulfate as above and the solution is filtered. The precipitate is dissolved in sufficient quantity of distilled water to give about 100 cc. of solution, containing 6.6 micrograms per cc. of vitamin $B_{12}$.

Example II

The vitamin $B_{12}$ concentrate as obtained per Example I is further purified as follows: about 100 cc. of the solution obtained from Example I is titrated to about pH 3 with an acid regenerated synthetic cationic resin ("Amberlite IR–120"). The mixture is filtered and the precipitate is discarded. The filtrate is treated with about 50 g. of aluminum oxide which has previously been washed with sulfuric acid to a pH of about 4. The mixture is filtered and the aluminum oxide is washed with three portions of about 100 cc. each of water. The filtrate and the washings are concentrated under vacuum to a volume of about 100 cc., containing about 6.4 micrograms per cc. of vitamin $B_{12}$. The aluminum oxide treatment is repeated and the filtrate and washings are again concentrated to about 100 cc. containing about 6.2 micrograms per cc. of vitamin $B_{12}$.

The concentrate is passed over a column of about 50 g. of cation and anion exchange resins alternately packed (the resins preferably used are "Amberlite IR–4B" and "Amberlite IR–120"). The column is washed with two portions of 100 cc. each of distilled water. The filtrate and washings are concentrated under vacuum to about 50 cc., containing 1.5% total solids and 12.4 micrograms per cc. of vitamin $B_{12}$.

The 50 cc. solution is passed over a column packed alternately with aluminum oxide which has previously been washed with sulfuric acid to a pH about 8, and aluminum oxide which has previously been washed with sulfuric acid to a pH about 4. The column is washed with a sufficient quantity of water so that the effluent is collected in fractions as follows: (1) The first 30 cc. contains 10.5 micrograms per cc. of vitamin $B_{12}$ and 0.45% total solids and is a deep pink colored solution. (2) The second 30 cc. contains 7.2 micrograms per cc. of vitamin $B_{12}$ and is a light orange colored solution; (3) and the last 100 cc. contains 0.80 micrograms per cc. of vitamin $B_{12}$ and is a yellow colored solution. Fractions 2 and 3 are repassed through the aluminum oxide column as above and added to fraction No. 1.

The combined fractions 1 and purified 2 and 3 are passed over a column of the alternately packed cation and anion exchange resins as above, and the column is washed with about 300 cc. of water. The solution is then concentrated under vacuum to a volume of about 58 cc. containing 10.5 micrograms per cc. of vitamin $B_{12}$ and 0.21% total solids.

The over-all yield obtained from the process is 611 micrograms of vitamin $B_{12}$ from an amount in the original solution of 943 micrograms per cc., giving a yield of about 65%.

Example III

A solution obtained from Example I is titrated to a pH of about 4 with a cation resin ("Amberlite IR–120 resin") and the mixture is filtered. The filtrate is passed over an aluminum oxide column packed as in Example II, and the filtrate and washings from the column are concentrated to about 50 cc. The solution is then run through a column of alternately packed cation and anion exchange resins as set forth in Example II. The filtrate from this resin column is concentrated and dried under vacuum.

The steps in this process may be alternated in position, or even eliminated if a vitamin $B_{12}$ concentrate of lesser purity is desired.

The solvent concentrations used in the process depend on the kind of solvent used generally, but they may be varied for the individual solvents by changing the temperature, etc. The concentration needed for other individual solvents may be determined experimentally.

The soluble electrolyte salt is shown in the examples as ammonium sulfate, but other salts may be used, for instance, sodium chloride, calcium chloride, etc.

Lead acetate is particularly effective in precipitating much of the unwanted matter, e. g., brown pigments, etc. The lead acetate precipitation may be carried out using the crude vitamin $B_{12}$ solution obtained either before or after the soluble electrolyte precipitation of the vitamin $B_{12}$. For instance, the solution obtained by dissolving the precipitate from ammonium sulfate is treated with lead acetate to precipitate brown pigments, and after filtering the solution it is treated with aluminum oxide and the synthetic resins as above. The precipitation is effective in concentrations of lead acetate up to about 10% by weight, but I prefer to use 2 to 4%.

Others may readily adapt the invention for use under various conditions of service by employing one or more of the novel features disclosed or equivalents thereof. As at present advised with respect to the apparent scope of my invention, I desire to claim the following subject matter.

I claim:

In the process of purifying a crude Vitamin $B_{12}$ concentrate obtained from a *Streptomyces griseus* fermentation culture medium, the steps which comprise: concentrating under vacuum a filtered fermentation culture medium to at least about ⅙ volume; adding acetone to the concentrated medium to form about a 50% solution, to precipitate a portion of inert matter; filtering off the inert matter; adding acetone to the filtered solution to increase the acetone concentration to at least about 70%, to precipitate crude Vitamin $B_{12}$; filtering to recover the Vitamin $B_{12}$ precipitate, dissolving the recovered precipitated Vitamin $B_{12}$ in the minimum amount of water to form a solution; and adding iso-propanol to the reconstituted Vitamin $B_{12}$ solution to form at least about a 70% iso-propanol solution, to precipitate purified Vitamin $B_{12}$.

HOWARD H. FRICKE.

REFERENCES CITED

The following references are of record in the file of this patent:

UNITED STATES PATENTS

| Number | Name | Date |
|---|---|---|
| 1,872,775 | Major | Aug. 23, 1932 |
| 2,292,841 | Necheles | Aug. 11, 1941 |
| 2,342,172 | Van Dyke | Feb. 22, 1944 |
| 2,378,449 | Tishler | June 19, 1945 |
| 2,443,485 | Waksman | June 15, 1948 |

FOREIGN PATENTS

| Number | Country | Date |
|---|---|---|
| 590,956 | Great Britain | Aug. 1, 1947 |

OTHER REFERENCES

Smith—Proceedings of the Biochemical Society in the Biochemical Journal, volume 43 (Number 1) (1949) pages VII, IX 167–81 $B_{12}$.

Smith—Nature, volume 161, April 24, 1948, pages 638, 639 167–81 $B_{12}$.

Rickes—Science, volume 108, Dec. 3, 1948, pages 634, 635 167–81 $B_{12}$

Science, volume 101, page 340 (1945).

Subbarow—Vitamins and Hormones, volume III (1945) page 266.

Reynolds—Proceedings of the Society for Experimental Biology and Medicine, volume 64, Jan. 1947, pages 50 to 54.

Rickes—Science, volume 107, Apr. 16, 1948. Pages 396 and 397. 167–81 $B_{12}$.

Vander Brook–Journal of Biological Chemistry, volume 165 (1946) pages 463 to 468 (260–236.5C).

Hawk—Practical Physiological Chemistry (1947) page 157.